United States Patent
Brooks et al.

(10) Patent No.: US 12,081,537 B2
(45) Date of Patent: Sep. 3, 2024

(54) SECURE INTER-APPLICATION COMMUNICATION WITH UNMANAGED APPLICATIONS USING CERTIFICATE ENROLLMENT

(71) Applicant: VMware, Inc., Palo Alto, CA (US)

(72) Inventors: Simon Paul Brooks, Napa, CA (US); Stephen Louis Turner, Atlanta, GA (US); Daniel Ochoa, Colorado Springs, CO (US)

(73) Assignee: VMware LLC, Palo Alto, CA (US)

( * ) Notice: Subject to any disclaimer, the term of this patent is extended or adjusted under 35 U.S.C. 154(b) by 227 days.

(21) Appl. No.: 17/580,998

(22) Filed: Jan. 21, 2022

(65) Prior Publication Data

US 2023/0239285 A1 Jul. 27, 2023

(51) Int. Cl.
*G06F 21/00* (2013.01)
*G06F 21/54* (2013.01)
*H04L 9/40* (2022.01)

(52) U.S. Cl.
CPC .......... *H04L 63/0823* (2013.01); *G06F 21/54* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 10,404,477 B1* | 9/2019 | Deck | H04L 9/3247 |
| 2003/0037261 A1* | 2/2003 | Meffert | H04N 21/44204 726/5 |
| 2004/0268142 A1* | 12/2004 | Karjala | H04L 63/0272 726/15 |
| 2005/0257271 A1* | 11/2005 | Lafornara | H04L 63/0823 726/26 |
| 2006/0272026 A1* | 11/2006 | Niwano | G06F 21/10 726/27 |
| 2008/0134297 A1* | 6/2008 | Clinick | G11B 20/00166 726/4 |
| 2011/0078447 A1* | 3/2011 | Novack | H04L 9/3263 713/175 |

(Continued)

OTHER PUBLICATIONS

Nisha, O.S. Jannath; Bhanu, S. Mary Saira. Detection of repackaged Android applications based on Apps Permissions. 2018 4th International Conference on Recent Advances in Information Technology (RAIT). https://ieeexplore.ieee.org/stamp/stamp.jsp?tp=&arnumber=8388984 (Year: 2018).*

(Continued)

*Primary Examiner* — Jeremiah L Avery
(74) *Attorney, Agent, or Firm* — Kim & Stewart LLP

(57) ABSTRACT

Disclosed are various approaches for secure inter-application communication with unmanaged applications using certificate enrollment. A certificate signing request can be received from an unmanaged application via an inter-application communication method supported by an operating system of a computing device, and an identity of the unmanaged application can be verified. The certificate signing request can be provided to a certifying authority, and a certificate can be received from the certifying authority. The certificate can be provided to the unmanaged application.

20 Claims, 4 Drawing Sheets

(56) References Cited

U.S. PATENT DOCUMENTS

| | | | | |
|---|---|---|---|---|
| 2012/0036220 | A1* | 2/2012 | Dare | H04L 67/01 |
| | | | | 709/217 |
| 2012/0240244 | A1* | 9/2012 | Orazi | G06F 21/6209 |
| | | | | 726/29 |
| 2017/0155640 | A1* | 6/2017 | Rykowski | H04L 63/0823 |
| 2017/0243229 | A1* | 8/2017 | Dokai | G06Q 30/018 |
| 2018/0145971 | A1* | 5/2018 | Mistry | H04L 63/0823 |
| 2019/0075099 | A1* | 3/2019 | Brouchier | H04L 9/0861 |
| 2019/0245700 | A1* | 8/2019 | Dobre | H04L 67/1097 |
| 2020/0382324 | A1* | 12/2020 | Pierscieniak | H04L 9/3268 |
| 2021/0357198 | A1* | 11/2021 | Cherches | H04L 63/0823 |
| 2022/0006800 | A1* | 1/2022 | Duchastel | H04L 63/083 |
| 2022/0263655 | A1* | 8/2022 | Murray | H04L 63/0823 |
| 2023/0209345 | A1* | 6/2023 | Moon | H04W 76/14 |
| | | | | 726/4 |

OTHER PUBLICATIONS

Kong, Shiyi et al. Runtime Monitoring of Software Execution Trace: Method and Tools. IEEE Access, vol. 8. https://ieeexplore.ieee.org/stamp/stamp.jsp?tp=&arnumber=9119396 (Year: 2020).*

Suzuki, Manami et al. Key Agreement Over Inter-Process Communication. IEEE Access, vol. 9. https://ieeexplore.ieee.org/stamp/stamp.jsp?tp=&arnumber=9557283 (Year: 2021).*

* cited by examiner

SECURE INTER-APPLICATION COMMUNICATION WITH UNMANAGED APPLICATIONS USING CERTIFICATE ENROLLMENT

BACKGROUND

The operating systems of computing devices may provide various mechanisms for data communication between applications or processes executing on the devices. These mechanisms may be referred to as inter-application (or inter-process) communication mechanisms, for example, or other related terms. With the growing number of applications available for different computing devices, platforms, and operating systems, one challenge is the need to achieve secure inter-application communications in these various contexts. Mobile device management platforms may provide features that help to achieve secure inter-application communications between different applications or processes executing on a single computing device or separate computing devices.

DETAILED DESCRIPTION

Disclosed are various approaches for secure inter-application communication with unmanaged applications using certificate enrollment. While mobile device management platforms may provide some features to ensure secure communications between two different applications, these features cannot be relied upon in all cases or for all applications. Indeed, many such features rely on both applications being fully enrolled for management with the mobile device management platform, which can present challenges for applications that are not configured for mobile device management. To that end, the disclosed approaches employ certificate enrollment to allow applications that are not enrolled with a mobile device management platform to securely communicate with applications are enrolled for management in a mobile device management platform.

Figure 1:
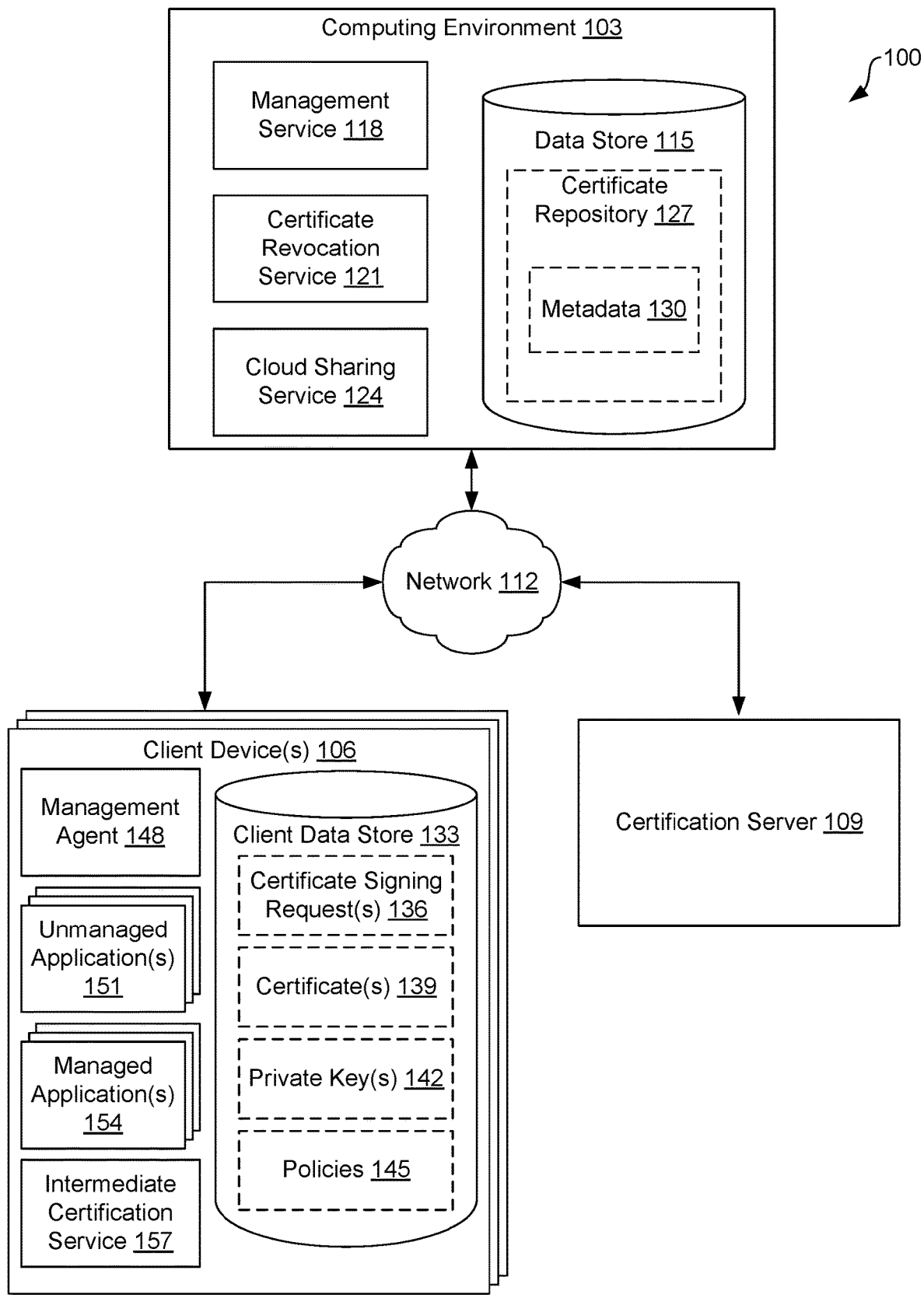
FIG. 1 shows an example of a network environment, according to various embodiments of the present disclosure.

FIG. 1 shows an example of a network environment 100 according to various embodiments. The network environment 100 can include a computing environment 103, one or more client device(s) 106, and a certification server 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 can include a data store 115. The computing environment can also execute a management service 118 and potentially other application(s).

The management service 118 can administer the operation of client device(s) 106 that are enrolled or otherwise registered with the management service 118. To this end, the management service 118 can also provide mechanisms for a client device 106 to enroll or otherwise register with the management service 118. The management can also install or cause to be installed various applications on the client device 106 or for various configuration settings of the client device 106 to be set to a specified value.

The certificate repository 127 can record certificates issued to the client devices 106. Certificates recorded in the certificate repository 127 can be discoverable by the client devices 106 and any applications executing thereon. When a certificate is recorded in the certificate repository 127, information regarding the certificate can be stored in the certificate repository 127 as metadata 130. The metadata 130 can include data regarding what certificates have been issued to a user, how those certificates are used, and other information regarding the certificates.

The certificate revocation service 121 can facilitate revocation of certificates issued to a client device 106. To that end, the certificate revocation service 121 can provide the revocation status of these certificates in response to queries from the client device 106. For example, the certificate revocation service 121 can, in some implementations, return metadata 130 regarding a certificate in response to a query. The certificate revocation service 121 can maintain and/or obtain from the intermediate certification service 157 and/or certification server 109 a certificate revocation list (CRL) to track which certificates are currently valid. In some implementations, the certificate revocation service 121 can comply with a version of the online certificate status protocol (OSCP).

The cloud sharing service 124 can facilitate sharing of data between a first client device 106 and one or more second client devices 106 also associated with a user of the first client device 106. To share data through the cloud sharing service 124, the first client device 106 and second client device 106 can perform transport security layer (TLS) mutual authentication with the cloud sharing service 124. Each of the first client device 106 and second client device 106 can use an issued certificate to authenticate with the cloud sharing service 124. The first client device 106 and second client device 106 can likewise authenticate the cloud sharing service 124 using a certificate issued to the cloud sharing service 124. The first client device 106 and second client device 106 can then share data through the cloud sharing service 124.

The client device 106 can be representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can include a client data store 133 that can store one or more certificate signing request(s) 136, certificate(s) 139, private key(s) 142, and one or more policies 145, among other types of data. The client device can be configured to execute a management agent 148, an unmanaged application 151, one or more managed applications 154, and potentially other application(s).

The management agent 148 can be executed to register or enroll the client device 106 with the management service 118 and to implement or enforce compliance with various commands or instructions provided by the management service 118. The management agent 148 can be installed with elevated privileges or be effectuated through application programming interface(s) (API(s)) provided by an operating system of the client device 106 to manage the client device 106 on behalf of the management service 118. The management agent 148 can have the authority to manage data on the client device 106; to install, remove, or disable certain applications; or to install configuration profiles, such as VPN certificates, Wi-Fi profiles, email profiles, or other profiles for configuring various functions or applications of the client device 106. The management agent 148 can be enrolled or otherwise registered with the management service 118. The management agent 148 may be in compliance with policies 145 enforced by the management service 118.

The management agent 148 can obtain one or more certificates 139 on behalf of the unmanaged application 151. The management agent 148 can receive a certificate signing request 136 from the unmanaged application 151. After verifying an identity of the unmanaged application 151, the management agent 148 can provide the certificate signing request 136 to the intermediate certification service 157 to obtain a signed certificate 139, or the management agent 148 can generate and sign a certificate 139 for the unmanaged application 151. In some implementations, the management agent 148 can implement the secure certificate enrollment protocol (SCEP) or other digital certificate management protocol.

The management agent 148 can receive a certificate signing request 136 from the unmanaged application 151 using a platform-specific communication method of the client device 106. For example, the management agent 148 can receive the certificate signing request 136 using an inter-process communication or inter-application communication method provided by an operating system of the client device 106. Any method of inter-application or inter-process communication (IPC) supported by the operating system of the client device 106 can be used. Example methods can include memory-based file transfers, socket transfers, message queue transfers, and pipe transfers, among other techniques.

The management agent 148 can verify an identity of the unmanaged application 151. In particular, the management agent 148 can verify that the unmanaged application 151 is installed and executing the client device 106. In other words, the management agent 148 can identify that the unmanaged application 151 is installed and executing on a same device as the management agent 148.

In some implementations, the management agent 148 can verify the identity of the unmanaged application 151 using one or more methods supported by an operating system of the client device 106. For example, the management agent can verify the identity of the unmanaged application 151 using an application attestation service provided by the operating system of the client device 106. As another example, the management agent 148 can verify the identity of the unmanaged application 151 using data associated with an inter-process communication or inter-application communication between the management agent 148 and the unmanaged application 151. This data can include, for instance, an application identifier or a bundle identifier for the unmanaged application 151 and signing entity. The management agent 148 can validate this data by comparing it with data included in an allow list, with which the unmanaged application 151 may have been registered when the unmanaged application 151 was installed. In some implementations, the management agent 148 can employ techniques such as jailbreak detection to prevent the inter-process or inter-application communication from the unmanaged application 151 from being intercepted, spoofed, or otherwise compromised.

The management agent 148 can receive the certificate signing request 136 from the unmanaged application 151. If the certificate signing request 136 received from the unmanaged application 151 in an unsigned state, the management agent 148 can sign the certificate signing request 136 using a private key 142 that the management agent 148 has generated. Likewise, if the certificate signing request 136 was received from the unmanaged application 151 in an incomplete state, the management agent 148 can complete the certificate signing request 136 by including any information missing from the certificate signing request 136. Information to be included in the certificate signing request 136 can be specified by the policies 145.

The management agent 148 can provide the certificate signing request 136 to the intermediate certification service 157 or the certification server 109 to obtain a signed certificate 139 for the unmanaged application 151. Whether the management agent 148 provides the certificate signing request 136 to either the intermediate certification service 157 or the certification server 109 can depend on the scope and usage of the requested certificate 139, which can be specified in the certificate signing request 136 and/or the policies 145. For example, if the requested certificate 139 is intended to allow the unmanaged application 151 to share data with a managed application 154 executing on the client device 106, the management agent 148 can provide the certificate signing request 136 to the intermediate certification service 157. As another example, if the requested certificate 139 is intended to allow the unmanaged application 151 to share data with other client devices 106, the management agent 148 can provide the certificate signing request 136 to the certification server 109. In some implementations, though, the management agent 148 can be issued an intermediate certificate by the certification server 109, and so the management agent 148 can generate and sign the certificate 139.

In some implementations, the management agent 148 can record the signed certificate 139 in the certificate repository 127. In other implementations, information from the certificate 139 may have already been recorded with the management service 118. Information from the certificate 139 already recorded with the management service 118 can include information sufficient for revocation of the certificate 139.

The management agent 148 can provide the signed certificate 139 to the unmanaged application 151. If the private key 142 was generated by the management agent 148 and not the unmanaged application 151, the management agent 148 can also provide the private key 142 to the unmanaged application 151. In some implementations, information from the policies 145 regarding usage of the certificate 139 and limitations on data sharing by or with the unmanaged application 151 can be included in the certificate 139. If this policy 145 information is not included in the certificate 139, the management agent 148 can provide the policy 145 information to the unmanaged application 151. The management agent 148 can then discard the certificate 139, as well as the private key 142 if the private key 142 was generated by the management agent 148.

The management agent 148 can handle or otherwise facilitate revocation of certificates 139 issued to the unmanaged application 151. In some implementations, the management agent 148 can perform certificate 139 revocation operations when specified by the policies 145 or commanded by the management service 118. In other implementations, the management agent 148 can interact with the certificate revocation service 121 for revoking certificates 139 issued to the unmanaged application 151. For example, to revoke any certificates 139 issued to a user of the client device 106, the management agent 148 can query the certificate revocation service to determine what certificates 139 have been issued to that user. The management agent 148 can then receive metadata 130 regarding what certificates 139 have been issued to a user, how those certificates 139 are used, and other information on the certificates 139.

The unmanaged application 151 can be any application, application extension, or other application-related component executed on the client device 106 and not enrolled for management by the management service 118. The unmanaged application 151 can be associated with a user, who may likewise be associated with one or more of the managed applications 154 and the client device 106. The unmanaged application 151 can include a browser, a dedicated application, or other executable, and may generate a user interface such as web page, an application screen, or other user mechanism for obtaining user input.

The unmanaged application 151 can securely share data with one or more of the managed applications 154 using inter-application or inter-process communication methods or by another technique. For example, the unmanaged application 151 can share data using method of inter-application or inter-process communication (IPC) supported by the operating system of the client device 106 like memory-based file transfers, socket transfers, message queue transfers, and pipe transfers, or other technique. To share data with a managed application 154, the unmanaged application 151 can first authenticate itself with the managed application 154 using a certificate 139 issued by the intermediate certification service 157.

In like manner, a first unmanaged application 151 executing on the client device 106 may also securely share data with a second unmanaged application 151 also executing on the client device 106 using inter-application or inter-process communication methods or by another technique, as discussed above. The first unmanaged application 151 can likewise authenticate itself with the second unmanaged application 151 using a first certificate 139 issued to the first unmanaged application 151 by the intermediate certification service 157. However, the first unmanaged application 151 can also authenticate the second unmanaged application 151 by verifying a second certificate 139 issued to the second unmanaged application 151 by the intermediate certification service 157.

The unmanaged application 151 can obtain a certificate 139 by interacting with the management agent 148. The unmanaged application can generate a certificate signing request 136 to provide to the management agent 148. In the certificate signing request 136, the unmanaged application 151 can include at least a portion of the information that will be included in the resulting certificate 139. What information the unmanaged application 151 should include in the certificate signing request 136 can be specified in the policies 145. The unmanaged application 151 can also generate a private key 142 with which to sign the certificate signing request 136, unless the policies 145 specify that the private key 142 should be generated by the management agent 148 instead. The management agent 148 can receive a certificate signing request 136 from the unmanaged application 151 using a platform-specific communication method of the client device 106.

The unmanaged application 151 can provide the certificate signing request 136 to the management agent 148 using, for example, an inter-process communication or inter-application communication method provided by an operating system of the client device 106. Any method of inter-application or inter-process communication (IPC) supported by the operating system of the client device 106 can be used. Example methods can include memory-based file transfers, socket transfers, message queue transfers, and pipe transfers, among other techniques.

In some implementations, inter-application communication between the unmanaged application 151 and applications executing on other devices associated with a user (or even on the client device 106) can take place through the cloud sharing service 124. To share data through the cloud sharing service 124, the unmanaged application 151—as well as any other applications with which the unmanaged application 151 attempts to share data—can perform transport security layer (TLS) mutual authentication with the cloud sharing service 124. The unmanaged application 151 can use its certificate 139 to authenticate with the cloud sharing service 124, and the unmanaged application 151 can likewise authenticate the cloud sharing endpoint using a certificate issued to the cloud sharing service 124. The unmanaged application 151 can then share data through the cloud sharing service 124 with any other applications associated with a user that likewise mutually authenticate with the cloud sharing service 124.

In some implementations, the unmanaged application 151 can integrate directly with the certification server 109 to generate certificates 139 for the unmanaged application 151 and the client device 106. For example, a dynamic allow list can be implemented such that the unmanaged application 151 can query the certificate revocation service 121 to determine whether a certificate 139 for a managed application 154 included in the allow list is valid.

As another example, the unmanaged application 151 can copy data from and paste data to a public or private shared clipboard implemented using a public key infrastructure (PKI). The shared clipboard can likewise be accessible to one or more managed applications 154. The unmanaged application 151 can query the certificate revocation service 121 to determine whether a certificate 139 of a managed application 154 sharing data using the shared clipboard is valid. The unmanaged application 151 can also encrypt and sign data shared with a managed application 154 using the shared clipboard.

As an additional example, the unmanaged application 151 can use platform-specific sharing facilities. When data is shared with the unmanaged application 151, the unmanaged application 151 can query the certificate revocation service 121 to validate a signer of the shared data. Likewise, when the unmanaged application 151 attempts to share data with a managed application 154, the unmanaged application 151 can sign the data and encrypt the data using a public key of the managed application 154.

The managed application(s) 154 can represent a variety of applications that are installed as managed applications that are enrolled with the management service 118. The managed applications 154 can include device management applications, enterprise applications, social networking applications, word processors, spreadsheet applications, media viewing applications, or other applications. A managed application 154 can securely share data with the unmanaged application 151 after authenticating the unmanaged application 151. For example, the managed application 154 can verify a certificate 139 issued to the unmanaged application 151. The managed application 154 can determine a validity of the certificate 139 and determine that the usage and limitations of the certificate 139 permit the unmanaged application 151 to share the data with the managed application 154.

The intermediate certification service 157 can issue certificates 139 to the unmanaged application 151. In that capacity, the intermediate certification service 157 can function as an intermediate certifying authority. The intermediate certification service 157 can receive a certificate signing request 136 from the management agent 148. The intermediate certification service 157 can validate the certificate signing request 136. For example, the intermediate certification service 157 can verify a digital signature included in the certificate signing request 136. The intermediate certification service 157 can then generate a certificate 139 using information from the certificate signing request 136. The information used to generate the certificate 139 can be specified in the policies 145. The intermediate certification service 157 can sign the certificate 139 using its intermediate certificate. After signing the certificate 139, the intermediate certification service 157 can return the signed certificate 139 to the management agent 148. In some implementations, the intermediate certification service 157 can be configured to implement and/or comply with one or more versions of SCEP or other certificate management protocol. In some implementations, certificate pinning may be provided for the intermediate certification service 157.

A certificate signing request 136 can be used to request a certificate 139 for the unmanaged application 151. The certificate signing request 136 can be generated by the unmanaged application 151. The certificate signing request 136 can be signed using the private key 142 by the management agent 148 or the unmanaged application 151. The certificate signing request 136 can be submitted by the management agent 148 to the intermediate certification service 157 or the certification server 109 to request a signed certificate 139. To which of the intermediate certification service 157 and the certification server 109 the certificate signing request 136 is submitted can depend on the scope and usage of the requested certificate 139, which can be specified in the certificate signing request 136 and/or the policies 145. In some implementations, however, the management agent 148 can instead sign the certificate 139 itself using an intermediate signing certificate issued to the management agent 148 if called for by the policies 145.

The certificate signing request 136 can include various types of information, such as, for example, information identifying the unmanaged application 151; the intended scope, usage, or limitations of the requested certificate 139; a public key to be included in the issued certificate 139; a digital signature generated using the private key 142; and other information specified by the policies 145. In some implementations, the certificate signing request 136 could also include, for example, authentication information, such as a onetime password, cryptographic challenge generated by a certificate provided by the management service 118, or other authentication credential.

A certificate 139 can allow the unmanaged application 151 authenticate itself with a managed application 154, other application, or other device with which the unmanaged application 151 will share data. A certificate 139 issued to the unmanaged application 151 can authenticate the unmanaged application 151 by verifying that the unmanaged application 151 is installed and executing on a same client device 106 as the management agent 148. Certificates 139 may be issued for the unmanaged application 151 and the client device 106. A certificate 139 can be generated by the unmanaged application 151 and provided to the management agent 148 for signing. In some implementations, a certificate 139 may be locally valid on the client device 106 and can be used to share data between the unmanaged application 151 and the managed applications 154. In other implementations, a certificate 139 may also allow the unmanaged application 151 to share data with other applications and devices associated with a user of the unmanaged application 151.

Information included in the certificate 139 can include, for instance, information that identifies the unmanaged application 151, the client device 106, a user associated with the unmanaged application 151, an enterprise or other group associated with the user, usage and limitations for the certificate 139 (e.g., the key usage), and potentially other information. The usage and limitations of the certificate 139 can include can in some implementations include custom key usage extensions to define restrictions on what entities with whom the unmanaged application 151 may share data.

In some implementations, multiple certificates 139 can be issued to the unmanaged application 151. By extension, multiple certificate signing requests 136 can be received from or generated on behalf of the unmanaged application 151. A separate certificate 139 with its own scope or usage limits can be issued to the unmanaged application 151 when called for by the policies 145. For example, if the unmanaged application 151 is be associated with multiple user accounts, the policies 145 can define different data security and sharing limitations for each user account. As another example, multiple certificates 139 can be issued to the unmanaged application 151 where the policies 145 define different limitations for the sharing of different types of data.

The policies 145 can define one or more rules for data sharing by and with the unmanaged application 151 and any other applications executing on the client device 106, as well as applications executing on other client devices 106. For example, the policies 145 can define information to be included in certificate signing requests 136 generated by or on behalf of the unmanaged application 151 and in certificates 139 issued to the unmanaged application 151, as well as a network address or other locator for the certification server 109. As an additional example, the policies 145 can define what information is to be included in an issued certificate 139 and the usage and limitations (e.g., the key usage) of the certificate 139. As an additional example, the policies 145 can also define what information for the certificate signing request 136 and/or the certificate 139 can be provided by the unmanaged application 151 and which information can be provided by the management agent 148. The policies 145 can be received from the management service 118 and stored in the client data store 133 when the management agent 148 is installed or deployed on the client device 106 and/or when the management agent 148 is registered or enrolled with the management service 118. In like manner, the policies 145 can be updated based at least in part on policy updates received from the management service 118.

The certification server 109 can act as a certification authority that can generate and issue certificates 139 to the unmanaged application 151 executing on a client device 106 to share data with other client devices 106. In some implementations, the certification server 109 can be configured to implement and/or comply with one or more versions of SCEP or other certificate management protocol. In such cases, a certificate 139 used by the unmanaged application 151 for inter-application communication can be a SCEP certificate.

Figure 2:
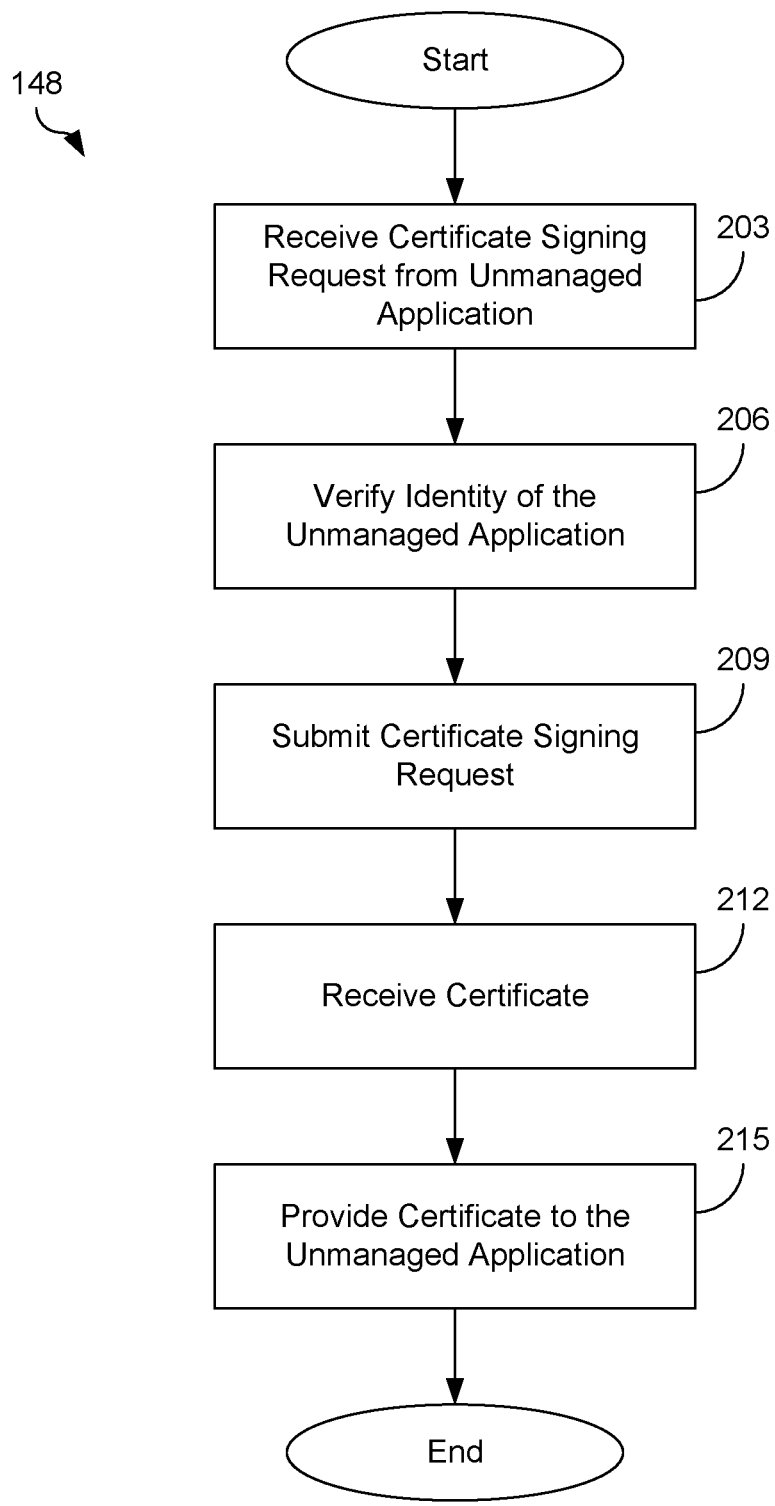
FIG. 2 shows a flowchart that provides one example of the operation of a portion of a management agent executed in the network environment of FIG. 1, according to various embodiments of the present disclosure.

FIG. 2 shows a flowchart that provides one example of the operation of a portion of the management agent 148. The flowchart of FIG. 2 provides merely an example of the many different types of functional arrangements that can be employed to implement the operation of the depicted portion of the management agent 148. As an alternative, the flowchart of FIG. 2 can be viewed as depicting an example of elements of a method implemented within the network environment 100.

At step 203, the management agent 148 can receive a certificate signing request 136 from the unmanaged application 151. The certificate signing request 136 can include various types of information, such as, for example, information identifying the unmanaged application 151; the intended scope, usage, or limitations of the requested certificate 139; a public key to be included in the issued certificate 139; a digital signature generated using the private key 142; authentication information; and other information specified by the policies 145. The management agent 148 can also sign the certificate signing request 136 using a private key 142 unless the certificate signing request 136 was already signed by the unmanaged application 151.

At step 206, the management agent 148 can verify an identity of the unmanaged application 151. In verifying the identity of the unmanaged application 151, the management agent 148 can verify that the unmanaged application 151 is, like the management agent 148, installed and executing the client device 106. The management agent 148 can verify the identity of the unmanaged application 151 using one or more methods supported by an operating system of the client device 106 like, for example, an application attestation service or using data associated with an inter-process communication or inter-application communication between the management agent 148 and the unmanaged application 151. The data associated with the inter-process or inter-application communication can include, for instance, an application identifier or a bundle identifier for the unmanaged application 151 and signing entity. The management agent 148 can validate this data against data included in an allow list.

At step 209, the management agent 148 can submit the certificate signing request 136. The management agent 148 can submit the certificate signing request 136 to the intermediate certification service 157 or the certification server 109. Whether the management agent 148 provides the certificate signing request 136 to the intermediate certification service 157 or to the certification server 109 can depend on the scope and usage of the requested certificate 139, which can be specified in the certificate signing request 136 and/or the policies 145.

At step 212, the management agent 148 can receive a signed certificate 139. Information included in the certificate 139 can include, for instance, information that identifies the unmanaged application 151, the client device 106, a user associated with the unmanaged application 151, an enterprise or other group associated with the user, usage and limitations for the certificate 139 (e.g., the key usage), and potentially other information specified in the policies 145.

At step 215, the management agent 148 can provide the signed certificate 139 to the unmanaged application 151. Any copies of the certificate 139 retained by the management agent 148 can then be discarded. If the management agent 148 previously signed the certificate signing request 136 using a private key 142, the management agent 148 can provide the private key 142 to the unmanaged application 151 and then discard any copies of the private key 142 retained by the management agent 148. The process can then proceed to completion.

Figure 3A:
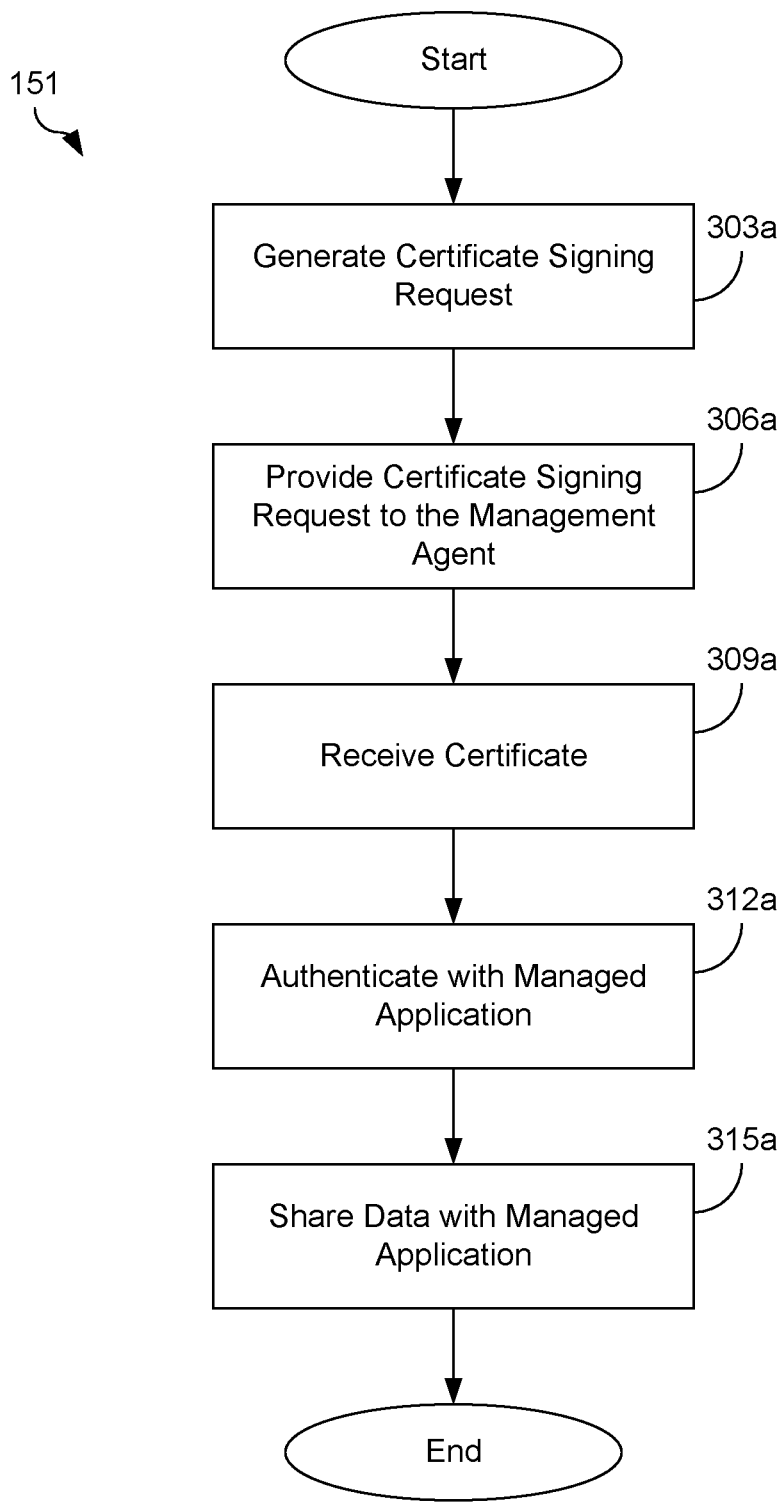
FIGS. 3A-3B show flowcharts that provide examples of the operation of a portion of an unmanaged application executed in the network environment of FIG. 1, according to various embodiments of the present disclosure.

FIG. 3A shows a flowchart that provides one example of the operation of a portion of the unmanaged application 151. The flowchart of FIG. 3A provides merely an example of the many different types of functional arrangements that can be employed to implement the operation of the depicted portion of the unmanaged application 151. As an alternative, the flowchart of FIG. 3A can be viewed as depicting an example of elements of a method implemented within the network environment 100.

At step 303a, the unmanaged application 151 can generate a certificate signing request 136. In the certificate signing request 136, the unmanaged application 151 can include at least a portion of the information that will be included in the resulting certificate 139. What information the unmanaged application 151 should include in the certificate signing request 136 can be specified in the policies 145. The unmanaged application 151 can also generate a private key 142 with which to sign the certificate signing request 136, unless the policies 145 specify that the private key 142 should be generated by the management agent 148 instead.

At step 306a, the unmanaged application 151 can provide the certificate signing request 136 to the management agent 148. The unmanaged application 151 can provide the certificate signing request 136 to the management agent 148 using, for example, an inter-process communication or inter-application communication method provided by an operating system of the client device 106. Any method of inter-application or inter-process communication (IPC) supported by the operating system of the client device 106 can be used. Example methods can include memory-based file transfers, socket transfers, message queue transfers, and pipe transfers, among other techniques.

At step 309a, the unmanaged application 151 can receive a signed certificate 139 from the management agent 148. In this example, the certificate 139 can have been issued by the intermediate certification service 157. Information included in the certificate 139 can include, for instance, information that identifies the unmanaged application 151, the client device 106, a user associated with the unmanaged application 151, an enterprise or other group associated with the user, usage and limitations for the certificate 139 (e.g., the key usage), and potentially other information specified in the policies 145.

At step 312a, the unmanaged application 151 can authenticate itself with a managed application 154. For example, the unmanaged application 151 can provide its signed certificate 139 for verification by the managed application 154. The managed application 154 can determine a validity of the certificate 139 and determine that the usage and limitations of the certificate 139 permit the unmanaged application 151 to share the data with the managed application 154.

At step 315a, the unmanaged application 151 can share data with the managed application 154. The unmanaged application 151 can securely share the data using an inter-application or inter-process communication methods or by another technique. For example, the unmanaged application 151 can share the data using method of inter-application or inter-process communication (IPC) supported by the operating system of the client device 106 like a memory-based file transfer, socket transfer, message queue transfer, pipe transfer, or other technique. The process can then proceed to completion.

Figure 3B:
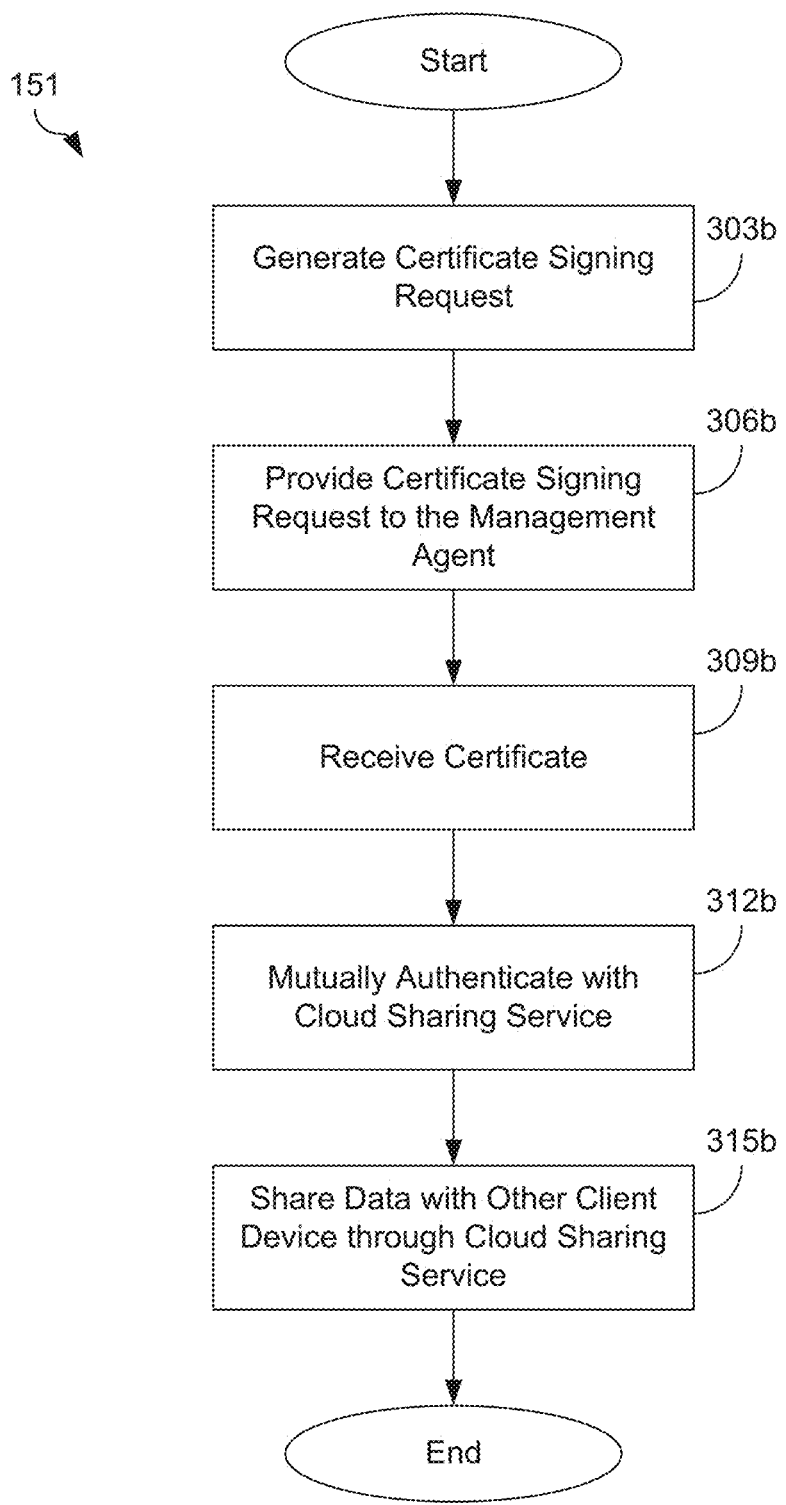

FIG. 3B shows a flowchart that provides one example of the operation of a portion of the unmanaged application 151. The flowchart of FIG. 3B provides merely an example of the many different types of functional arrangements that can be employed to implement the operation of the depicted portion of the unmanaged application 151. As an alternative, the flowchart of FIG. 3B can be viewed as depicting an example of elements of a method implemented within the network environment 100.

At step 303b, the unmanaged application 151 can generate a certificate signing request 136. In the certificate signing request 136, the unmanaged application 151 can include at least a portion of the information that will be included in the resulting certificate 139. What information the unmanaged application 151 should include in the certificate signing request 136 can be specified in the policies 145. The unmanaged application 151 can also generate a private key 142 with which to sign the certificate signing request 136, unless the policies 145 specify that the private key 142 should be generated by the management agent 148 instead.

At step 306b, the unmanaged application 151 can provide the certificate signing request 136 to the management agent 148. The unmanaged application 151 can provide the certificate signing request 136 to the management agent 148 using, for example, an inter-process communication or inter-application communication method provided by an operating system of the client device 106. Any method of inter-application or inter-process communication (IPC) supported by the operating system of the client device 106 can be used. Example methods can include memory-based file transfers, socket transfers, message queue transfers, and pipe transfers, among other techniques.

At step 309b, the unmanaged application 151 can receive a signed certificate 139 from the management agent 148. In this example, the certificate 139 can have been issued by the certification server 109. Information included in the certificate 139 can include, for instance, information that identifies the unmanaged application 151, the client device 106, a user associated with the unmanaged application 151, an enterprise or other group associated with the user, usage and limitations for the certificate 139 (e.g., the key usage), and potentially other information specified in the policies 145.

At step 312b, the unmanaged application 151 can mutually authenticate with the cloud sharing service 124. For example, the unmanaged application 151 can perform transport security layer (TLS) mutual authentication with the cloud sharing service 124 using the certificate 139. The unmanaged application 151 can likewise authenticate the cloud sharing service 124 using a certificate issued to the cloud sharing service 124.

At step 315b, the unmanaged application 151 can share data with another client device 106 using the cloud sharing service 124. The other client device 106 can be associated with a same user as the client device 106 on which the unmanaged application 151 is executing. The unmanaged application 151 can provide the data to the cloud sharing service 124, and an application executing on the other client device 106 can obtain the data from the cloud sharing service 124, demonstrating that the other client device 106 has likewise mutually authenticated with the cloud sharing service 124. The process can then proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

The invention claimed is:

1. A system comprising:
a computing device comprising a processor and a memory; and
machine-readable instructions stored in the memory that, when executed by the processor, cause the computing device to at least:
receive a request from an unmanaged application for a certificate issued to the unmanaged application, wherein the certificate is scoped for inter-application communications involving the unmanaged application;
in response to receiving the request from the unmanaged application, verify an identity of the unmanaged application;
in response to verifying the identity of the unmanaged application, request a certifying authority for the certificate; and
upon receiving the certificate from the certifying authority, provide the certificate to the unmanaged application to enable the unmanaged application to authenticate with another application using the certificate to perform inter-application communications between the unmanaged application and the other application.

2. The system of claim 1, wherein verifying the identity of the unmanaged application includes comparing data associated with a communication received from the unmanaged application, to data included in an allow list.

3. The system of claim 1, wherein requesting the certifying authority for the certificate includes: signing a request for the certificate using a private key generated by the computing device and then transmitting the signed request to the certifying authority.

4. The system of claim 1, wherein the certifying authority executes on the computing device, and wherein the machine-readable instructions stored in the memory, when executed by the processor, further cause the computing device to at least:
before requesting the certifying authority for the certificate, select the certifying authority based on the unmanaged application and the other application both executing on the computing device.

5. The system of claim 1, wherein the certifying authority executes remotely from the computing device, and wherein the machine-readable instructions stored in the memory, when executed by the processor, further cause the computing device to at least:
before requesting the certifying authority for the certificate, select the certifying authority based on the unmanaged application and the other application executing on different computing devices.

6. The system of claim 1, wherein the machine-readable instructions stored in the memory, when executed by the processor, further cause the computing device to at least:
after providing the certificate to the unmanaged application, query a certificate revocation service for certificates to revoke;
receive from the certificate revocation service in response to the query, metadata indicating to revoke the certificate; and
in response to receiving the metadata, revoke the certificate from being used by the unmanaged application to perform future inter-application communications.

7. The system of claim 1, wherein based on the scope of the certificate, providing the certificate to the unmanaged application enables the unmanaged application to share data with applications executing on the computing device.

8. The system of claim 1, wherein based on the scope of the certificate, providing the certificate to the unmanaged application enables the unmanaged application to share data with applications executing on a different computing device than the unmanaged application executes on.

9. The system of claim 1, wherein based on the scope of the certificate, providing the certificate to the unmanaged application enables the unmanaged application to share data of a type associated with the certificate, with the other application.

10. A method for enabling an unmanaged application to perform inter-application communications with another application, the method comprising:
receiving a request from the unmanaged application for a certificate issued to the unmanaged application, wherein the certificate is scoped for inter-application communications involving the unmanaged application;
in response to receiving the request from the unmanaged application, verifying, an identity of the unmanaged application;
in response to verifying the identity of the unmanaged application, requesting a certifying authority for the certificate; and
upon receiving the certificate from the certifying authority, providing the certificate to the unmanaged application to enable the unmanaged application to authenticate with the other application using the certificate to perform inter-application communications between the unmanaged application and the other application.

11. The method of claim 10, wherein the certifying authority executes on the same computing device as the unmanaged application, the method further comprising:
before requesting the certifying authority for the certificate, selecting the certifying authority based on the unmanaged application and the other application executing on the same computing device.

12. The method of claim 10, wherein the certifying authority executes remotely from a computing device on which the unmanaged application executes, the method further comprising:
before requesting the certifying authority for the certificate, selecting the certifying authority based on the unmanaged application and the other application executing on different computing devices.

13. The method of claim 10, further comprising:
after providing the certificate to the unmanaged application, querying a certificate revocation service for certificates to revoke;
receiving from the certificate revocation service in response to the query, metadata indicating to revoke the certificate; and
in response to receiving the metadata, revoking the certificate from being used by the unmanaged application to perform future inter-application communications.

14. The method of claim 10, wherein based on the scope of the certificate, providing the certificate to the unmanaged application enables the unmanaged application to share data with applications executing on a different computing device than the unmanaged application executes on.

15. The method of claim 10, wherein based on the scope of the certificate, providing the certificate to the unmanaged application enables the unmanaged application to share data of a type associated with the certificate, with the other application.

16. A non-transitory, computer-readable medium comprising program instructions that, when executed by a processor of a computing device, cause the computing device to at least:
- receive a request from an unmanaged application for a certificate issued to the unmanaged application, wherein the certificate is scoped for inter-application communications involving the unmanaged application;
- in response to receiving the request from the unmanaged application, verify an identity of the unmanaged application;
- in response to verifying the identity of the unmanaged application, request a certifying authority for the certificate; and
- upon receiving the certificate from the certifying authority, provide the certificate to the unmanaged application to enable the unmanaged application to authenticate with another application using the certificate to perform inter-application communications between the unmanaged application and the other application.

17. The non-transitory, computer-readable medium of claim 16, wherein verifying the identity of the unmanaged application includes comparing data associated with a communication received from the unmanaged application, to data included in an allow list.

18. The non-transitory, computer-readable medium of claim 16, wherein requesting the certifying authority for the certificate includes: signing a request for the certificate using a private key generated by the computing device and then transmitting the signed request to the certifying authority.

19. The non-transitory, computer-readable medium of claim 16, wherein based on the scope of the certificate, providing the certificate to the unmanaged application enables the unmanaged application to share data with applications executing on the computing device.

20. The non-transitory, computer-readable medium of claim 16, wherein based on the scope of the certificate, providing the certificate to the unmanaged application enables the unmanaged application to share data of a type associated with the certificate, with the other application.

* * * * *